United States Patent
Arai et al.

(10) Patent No.: US 8,352,119 B2
(45) Date of Patent: Jan. 8, 2013

(54) VEHICLE GRADIENT ESTIMATING DEVICE AND VEHICLE TRAVELING CONTROL DEVICE

(75) Inventors: Toshiaki Arai, Utsunomiya (JP);
Hiroshi Sato, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 350 days.

(21) Appl. No.: 12/761,802

(22) Filed: Apr. 16, 2010

(65) Prior Publication Data

US 2010/0268416 A1  Oct. 21, 2010

(30) Foreign Application Priority Data

Apr. 21, 2009  (JP) ................ 2009-103075

(51) Int. Cl.
*G01M 17/00* (2006.01)
(52) U.S. Cl. ....................................... 701/35
(58) Field of Classification Search ............ 701/35
See application file for complete search history.

(56) References Cited

U.S. PATENT DOCUMENTS

2004/0259683 A1* 12/2004 Katakura et al. ......... 477/111

FOREIGN PATENT DOCUMENTS

| JP | 11-255004 | 9/1999 |
|---|---|---|
| JP | 11-351864 | 12/1999 |
| JP | 2003-335230 | 11/2003 |
| JP | 2005-035347 | 2/2005 |
| JP | 2005-517848 | 6/2005 |
| JP | 2009-006834 | 1/2009 |
| JP | 2009-040308 | 2/2009 |
| JP | 2009-149137 | 7/2009 |
| WO | 03/068573 A2 | 8/2003 |

* cited by examiner

*Primary Examiner* — Thomas Tarcza
*Assistant Examiner* — Maceeh Anwari
(74) *Attorney, Agent, or Firm* — Rankin, Hill & Clark LLP

(57) ABSTRACT

A vehicle gradient estimating device includes: a vehicle speed sensor which detects a traveling speed of a subject vehicle; an acceleration calculating unit which calculates an acceleration of the subject vehicle on the basis of the traveling speed; an engine load deceleration calculating unit which calculates a deceleration due to an engine load of the subject vehicle; an acceleration correcting unit which corrects the acceleration by using the deceleration; a brake fluid pressure detecting unit which detects a brake fluid pressure of the subject vehicle; and a first gradient estimating unit which estimates a gradient of a road being traveled of the subject vehicle, wherein the first gradient estimating unit estimates the gradient on the basis of a ratio between the brake fluid pressure and the acceleration corrected by the acceleration correcting unit.

12 Claims, 6 Drawing Sheets

VEHICLE GRADIENT ESTIMATING DEVICE AND VEHICLE TRAVELING CONTROL DEVICE

BACKGROUND OF THE INVENTION

Priority is claimed on Japanese Patent Application No. 2009-103075, filed on Apr. 21, 2009, the contents of which are incorporated herein by reference.

1. Field of the Invention

The present invention relates to a vehicle gradient estimating device and a vehicle traveling control device.

2. Description of the Related Art

Heretofore, there has been known a road gradient estimating device including an acceleration sensor for detecting an acceleration acting on a vehicle in the horizontal direction and an actual acceleration sensor for calculating an acceleration from a variation in the speed of a vehicle, and estimating a road surface gradient of a road being traveled on the basis of a difference between an output of the actual acceleration sensor and an output of the acceleration sensor reflecting an acceleration of gravity due to the road surface gradient of the road being traveled (for example, refer to Japanese Unexamined Patent Application, First Publication No. H11-351864).

In addition, for some time, there has been known the following traveling control device for detecting a road surface gradient of a road being traveled from a predetermined road surface gradient characteristic with respect to a brake pressure on the basis of a brake pressure obtained when a vehicle started to move by gradually decreasing the brake pressure in a vehicle stop state (for example, refer to Japanese Unexamined Patent Application, First Publication No. 2005-035347).

However, in the road gradient estimating device according to the related art, since the road surface gradient is estimated on the basis of the output of the acceleration sensor mounted to the vehicle, when a difference arises in a mounting angle of the acceleration sensor, there is a problem in that an estimation error of the road surface gradient increases. In addition, even when an offset of an output increases due to a variation in timing of the acceleration sensor, there is a problem in that the estimation error of the road surface gradient increases.

In addition, since it is difficult to automatically correct the estimation error of the road surface gradient caused by the acceleration sensor when the vehicle travels or stops, there is a problem in that an inappropriate traveling control is performed due to a road surface gradient having a large estimation error.

When a downhill is estimated as a flat road, there is a problem in that a subject vehicle inappropriately moves forward to be excessively close to a preceding vehicle. In addition, when a flat road is estimated as an uphill or a downhill, there is a problem in that a starting driving force or a stopping braking force becomes excessively large or small. However, in this case, when an appropriate distance between a forward object and the subject vehicle is ensured by a driver in addition to a feedback control of a driving force or a braking force, or an output of a distance sensor for detecting a distance between the forward object such as a preceding vehicle and the subject vehicle, it is possible to appropriately control a traveling state of the subject vehicle so as to prevent a collision between the subject vehicle and the object existing in front of the subject vehicle.

However, when the uphill where the subject vehicle may move backward is estimated as a flat road, there is problem in that the subject vehicle moves backward when the vehicle stops or starts. When an appropriate inter-vehicular distance is not ensured between another subsequent vehicle and the subject vehicle, there is a problem in that it is difficult to prevent a collision between the subject vehicle and another vehicle.

In addition, in the following traveling control device according to the related art, since the road surface gradient is detected after the stopped subject vehicle actually starts to move, it is not possible to prevent an inappropriate movement such as a backward movement of the subject vehicle. As a result, it is not possible to improve the estimation precision of the road surface gradient.

The present invention was made to solve the problems, and an object thereof is to provide a vehicle gradient estimating device and a vehicle traveling control device which are capable of performing an appropriate traveling control in accordance with a gradient estimation result by improving estimation precision of a gradient of a road being traveled.

SUMMARY OF THE INVENTION

The present invention adopts the followings in order to solve the problems and thus achieve the associated objects. That is:

(1) A vehicle gradient estimating device according to the present invention includes: a vehicle speed sensor which detects a traveling speed of a subject vehicle; an acceleration calculating unit which calculates an acceleration of the subject vehicle on the basis of the traveling speed; an engine load deceleration calculating unit which calculates a deceleration due to an engine load of the subject vehicle; an acceleration correcting unit which corrects the acceleration by using the deceleration; a brake fluid pressure detecting unit which detects a brake fluid pressure of the subject vehicle; and a first gradient estimating unit which estimates a gradient of a road being traveled of the subject vehicle, wherein the first gradient estimating unit estimates the gradient on the basis of a ratio between the brake fluid pressure and the acceleration corrected by the acceleration correcting unit.

With the vehicle gradient estimating device according to (1) above, the gradient of the road being traveled is estimated on the basis of the brake fluid pressure and the acceleration calculated from the traveling speed of the vehicle immediately before the vehicle stops (for example, a period before the vehicle speed is equal to or less than 2 km/h) without using an acceleration sensor for directly detecting the vehicle body acceleration. Accordingly, it is possible to easily improve the estimation precision, and to accurately estimate whether the road being traveled is a slope (uphill or downhill).

In addition, since the acceleration calculated from the traveling speed of the vehicle is corrected by the deceleration of the vehicle due to the engine load, it is possible to further improve the estimation precision of the gradient (particularly, the gradient of the uphill) of the road being traveled.

(2) In the vehicle gradient estimating device according to (1) above, it may be arranged such that: the vehicle gradient estimating device is further provided with a storage unit which stores data of the brake fluid pressure and the acceleration corrected by the acceleration correcting unit for a predetermined time; and the first gradient estimating unit estimates the gradient on the basis of the data within the predetermined time before a time point when the traveling speed is equal to or less than a predetermined value among the data stored in the storage unit.

With the vehicle gradient estimating device according to (2) above, since the gradient of the road being traveled is estimated on the basis of data within a predetermined time (for example, 2 seconds or the like) in the past, it is possible to easily improve the estimation precision.

(3) In the vehicle gradient estimating device according to (2) above, it may be arranged such that: the vehicle gradient estimating device is further provided with a peak value calculating unit which calculates a peak value of the acceleration corrected by the acceleration correcting unit among the data stored for the predetermined time; and the first gradient estimating unit estimates the gradient on the basis of the ratio between the brake fluid pressure and the acceleration within a predetermined ratio range with respect to the peak value among the data stored in the storage unit.

With the vehicle gradient estimating device according to (3) above, since data of the acceleration regarding the predetermined ratio range with respect to the peak value within a predetermined time is used among data stored in the ring buffer, it is possible to prevent a problem that the estimation error of the gradient increases due to data regarding the acceleration calculated from the traveling speed in a low speed region where the detection error increases.

(4) In the vehicle gradient estimating device according to (1) above, it may be arranged such that: the vehicle gradient estimating device is further provided with a gear shift information obtaining unit which obtains an information on a gear shift state of a transmission mounted on the subject vehicle; and the engine load deceleration calculating unit calculates the deceleration on the basis of the information on the gear shift state and the traveling speed.

With the vehicle gradient estimating device according to (4) above, it is possible to improve the calculation precision of the deceleration of the vehicle due to the engine load on the basis of information on the gear shift state of the transmission. Accordingly, it is possible to appropriately correct the acceleration calculated from the traveling speed of the vehicle, and thus to highly precisely calculate the deceleration due to the brake operation.

(5) In the vehicle gradient estimating device according to (1) above, it may be arranged such that the vehicle gradient estimating device is further provided with: an acceleration sensor which detects an acceleration of the subject vehicle in a longitudinal direction; a second gradient estimating unit which estimates a gradient of the road being traveled on the basis of the acceleration in the longitudinal direction detected by the acceleration sensor and the acceleration calculated on the basis of the traveling speed detected by the vehicle speed sensor; and a vehicle control gradient setting unit which sets the larger one of the gradient estimated by the first gradient estimating unit and the gradient estimated by the second gradient estimating unit as a vehicle control gradient.

With the vehicle gradient estimating device according to (5) above, since the larger one of two gradients obtained by different estimation processes is set as the vehicle control gradient, it is possible to prevent a problem of a hill being estimated as a flat road, and thus to prevent the subject vehicle from moving backward down a hill.

(6) A vehicle traveling control device according to the present invention includes: the vehicle gradient estimating device according to (5) above; an inter-vehicular distance detecting unit which is mounted on the subject vehicle and which detects an inter-vehicular distance between the subject vehicle and a preceding vehicle; and a traveling control unit which controls a traveling state and a stop state of the subject vehicle following the preceding vehicle on the basis of the vehicle control gradient and the inter-vehicular distance.

With the vehicle traveling control device according to (6) above, since the traveling state and the stop state of the subject vehicle following the preceding vehicle is controlled on the basis of the inter-vehicular distance and the vehicle control gradient, even when a starting driving force is set due to an erroneous estimation in which the flat road is estimated as the uphill, it is possible to prevent a problem that the inter-vehicular distance between the preceding vehicle and the subject vehicle is not appropriate.

(7) A vehicle gradient estimating method according to the present invention includes the steps of: detecting a traveling speed of a subject vehicle; calculating an acceleration of the subject vehicle on the basis of the traveling speed; calculating a deceleration due to an engine load of the subject vehicle; correcting the acceleration by using the deceleration to obtain a corrected acceleration; detecting a brake fluid pressure of the subject vehicle; and estimating a first gradient of a road being traveled of the subject vehicle on the basis of a ratio between the brake fluid pressure and the corrected acceleration.

With the vehicle gradient estimating method according to (7) above, the gradient of the road being traveled is estimated on the basis of the brake fluid pressure and the acceleration calculated from the traveling speed of the vehicle immediately before the vehicle stops (for example, a period before the vehicle speed is equal to or less than 2 km/h) without using an acceleration sensor for directly detecting the vehicle body acceleration. Accordingly, it is possible to easily improve the estimation precision, and to accurately estimate whether the road being traveled is a slope (uphill or downhill).

In addition, since the acceleration calculated from the traveling speed of the vehicle is corrected by the deceleration of the vehicle due to the engine load, it is possible to further improve the estimation precision of the gradient (particularly, the gradient of the uphill) of the road being traveled.

(8) In the vehicle gradient estimating method according to (7) above, it may be arranged such that: the vehicle gradient estimating method is further provided with the step of storing data of the brake fluid pressure and the corrected acceleration for a predetermined time; and in the step of estimating the first gradient, the first gradient is estimated on the basis of the data within the predetermined time before a time point when the traveling speed is equal to or less than a predetermined value among the stored data.

With the vehicle gradient estimating method according to (8) above, since the gradient of the road being traveled is estimated on the basis of data within a predetermined time (for example, 2 seconds or the like) in the past, it is possible to easily improve the estimation precision.

(9) In the vehicle gradient estimating method according to (8) above, it may be arranged such that: the vehicle gradient estimating method is further provided with the step of calculating a peak value of the corrected acceleration among the data stored for the predetermined time; and in the step of estimating the first gradient, the first gradient is estimated on the basis of the ratio between the brake fluid pressure and the corrected acceleration within a predetermined ratio range with respect to the peak value among the stored data.

With the vehicle gradient estimating method according to (9) above, since data of the acceleration regarding the predetermined ratio range with respect to the peak value within a predetermined time is used among data stored in the ring buffer, it is possible to prevent a problem that the estimation error of the gradient increases due to data regarding the acceleration calculated from the traveling speed in a low speed region where the detection error increases.

(10) In the vehicle gradient estimating method according to (7) above, it may be arranged such that: the vehicle gradient estimating method is further provided with the step of obtaining an information on a gear shift state of a transmission mounted on the subject vehicle; and in the step of calculating the deceleration, the deceleration is calculated on the basis of the information on the gear shift state and the traveling speed.

With the vehicle gradient estimating method according to (10) above, it is possible to improve the calculation precision of the deceleration of the vehicle due to the engine load on the basis of information on the gear shift state of the transmission. Accordingly, it is possible to appropriately correct the acceleration calculated from the traveling speed of the vehicle, and thus to highly precisely calculate the deceleration due to the brake operation.

(11) The vehicle gradient estimating method according to (7) above, may further includes the steps of: detecting an acceleration of the subject vehicle in a longitudinal direction; estimating a second gradient of the road on the basis of the acceleration provided by the detection and the acceleration calculated on the basis of the traveling speed; and selecting the larger one of the first gradient and the second gradient as a vehicle control gradient.

With the vehicle gradient estimating method according to (11) above, since the larger one of two gradients obtained by different estimation processes is set as the vehicle control gradient, it is possible to prevent a problem of a hill being estimated as a flat road, and thus to prevent the subject vehicle from moving backward down a hill.

(12) A vehicle traveling control method according to the present invention includes: the vehicle gradient estimating method according to (11) above; a step of detecting an inter-vehicular distance between the subject vehicle and a preceding vehicle; and a step of controlling a traveling state and a stop state of the subject vehicle following the preceding vehicle on the basis of the vehicle control gradient and the inter-vehicular distance.

With the vehicle traveling control method according to (12) above, since the traveling state and the stop state of the subject vehicle following the preceding vehicle is controlled on the basis of the inter-vehicular distance and the vehicle control gradient, even when a starting driving force is set due to an erroneous estimation in which the flat road is estimated as the uphill, it is possible to prevent a problem that the inter-vehicular distance between the preceding vehicle and the subject vehicle is not appropriate.

DETAILED DESCRIPTION OF THE INVENTION

Hereinafter, a vehicle gradient estimating device and a vehicle traveling control device according to an embodiment of the present invention will be described with reference to the drawings.

Figure 1:
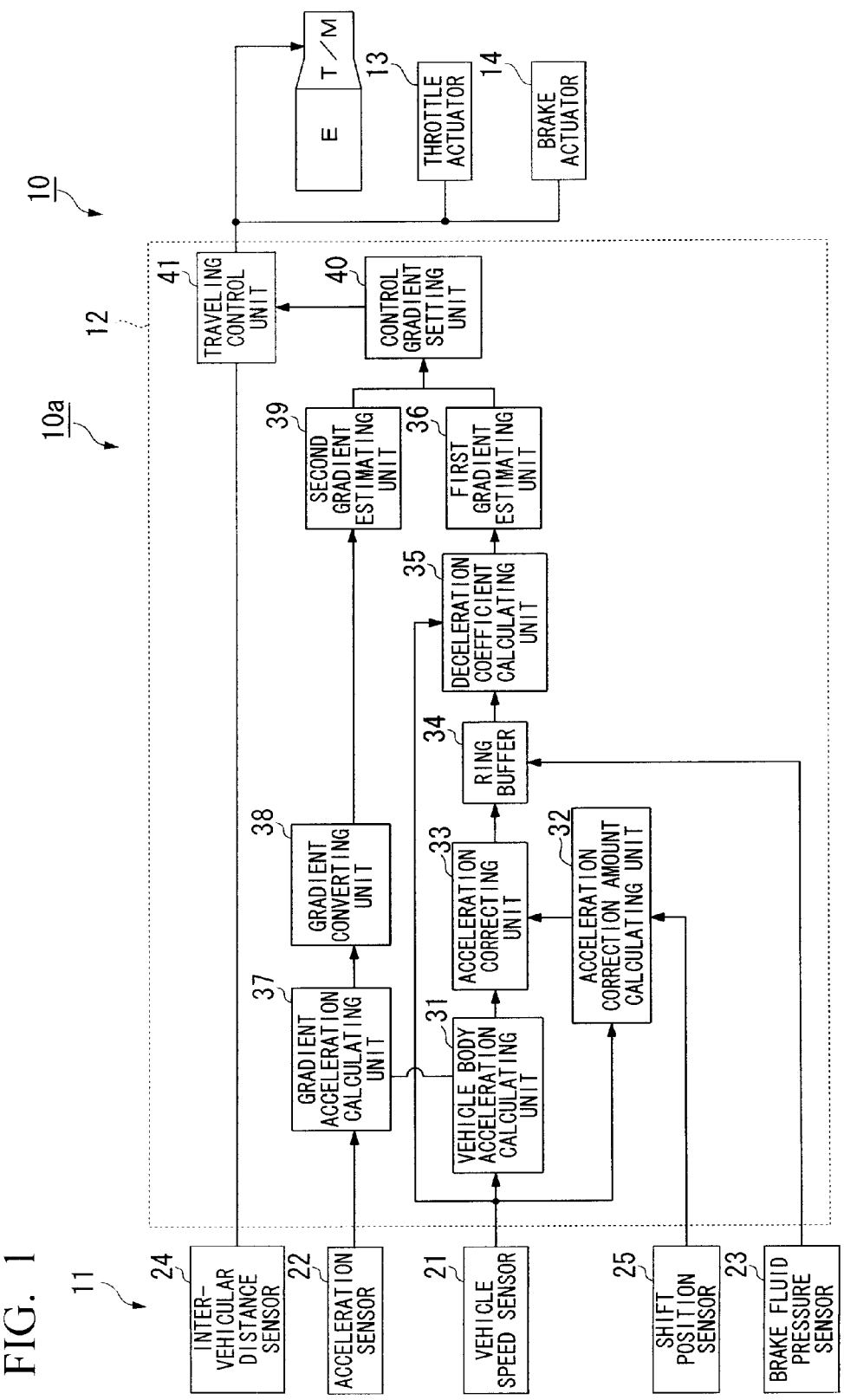
FIG. 1 is a block diagram illustrating a configuration of a vehicle gradient estimating device and a vehicle traveling control device according to an embodiment of the present invention.

A vehicle gradient estimating device 10a according to the present embodiment is provided in a vehicle traveling control device 10. As shown in FIG. 1, the vehicle traveling control device 10 is mounted to a vehicle which transmits a driving force of an internal combustion engine (E) to a driving wheel (not shown) via a transmission (T/M), and includes a vehicle state sensor 11, a control device 12, a throttle actuator 13, and a brake actuator 14. In addition, the vehicle gradient estimating device 10a includes the vehicle state sensor 11 and the control device 12.

The vehicle state sensor 11 includes a vehicle speed sensor 21 which detects a speed (vehicle speed) of a subject vehicle, an acceleration sensor 22 which detects an acceleration acting on a vehicle body in the longitudinal direction, a brake fluid pressure sensor 23 which detects a brake fluid pressure, an inter-vehicular distance sensor 24, a shift position sensor 25, and the like, and outputs signals of detection results of various vehicle information on the subject vehicle. The inter-vehicular distance sensor 24 detects an inter-vehicular distance between the subject vehicle and another vehicle (for example, a preceding vehicle or the like) existing in front of the subject vehicle by using a radar device (not shown), or the like. The shift position sensor 25 detects a shift position in accordance with the state of the transmission (T/M) selected by a driver via a select lever (not shown).

The control device 12 estimates a gradient of a road being traveled on the basis of the signals of the detection results of various vehicle information output from the vehicle state sensor 11, and controls a traveling state (for example, a traveling state and a stop state of the subject vehicle following the preceding vehicle) of the subject vehicle in accordance with the estimation result.

The control device 12 includes a vehicle body acceleration calculating unit 31, an acceleration correction amount calculating unit 32, an acceleration correcting unit 33, a ring buffer 34, a deceleration coefficient calculating unit 35, a first gradient estimating unit 36, a gradient acceleration calculating unit 37, a gradient converting unit 38, a second gradient estimating unit 39, a control gradient setting unit 40, and a traveling control unit 41.

The vehicle body acceleration calculating unit 31 calculates a variation in vehicle speed per unit of time on the basis of the signal of the detection result of the vehicle speed output from the vehicle speed sensor 21, and outputs the calculation result as a vehicle body acceleration.

The acceleration correction amount calculating unit 32 calculates an acceleration due to a creep torque caused by the transmission (T/M) and a deceleration (engine load deceleration) generated in the vehicle body due to an operation load of the internal combustion engine (E) as an acceleration correction amount.

Figure 2:
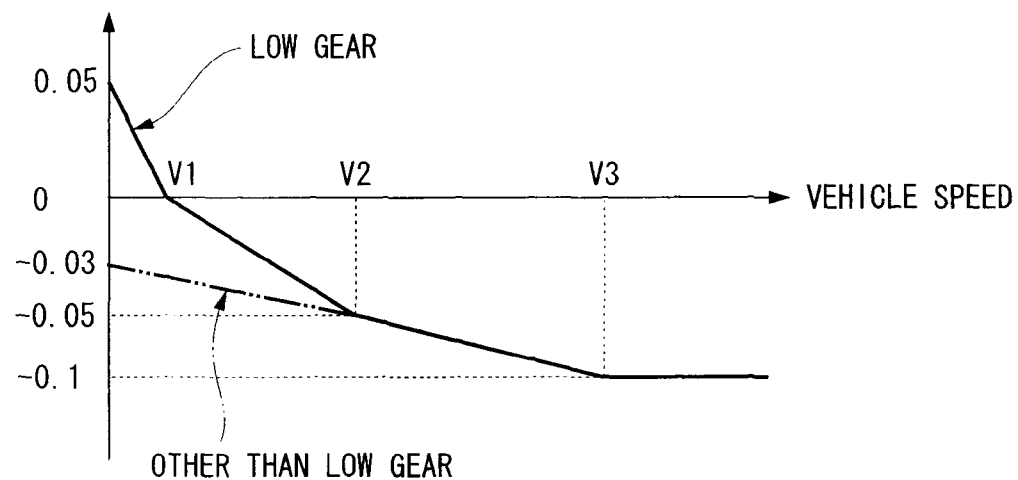
FIG. 2 is a graph illustrating a relationship of an acceleration correction amount, a vehicle speed, and a shift position according to the embodiment.

The acceleration correction amount calculating unit 32 calculates the acceleration correction amount by searching a map in a predetermined map as shown in FIG. 2 on the basis of the detection result of the vehicle speed output from the vehicle speed sensor 21 and the detection result of the shift position output from the shift position sensor 25.

The predetermined map shown in FIG. 2 shows a predetermined relationship of the acceleration correction amount, the vehicle speed, and the shift position. The acceleration correction amount includes an engine load deceleration and an acceleration due to a creep torque caused by the transmission (T/M).

The engine load deceleration tends to decrease in accordance with a decrease in vehicle speed. The variation characteristic is set so as to be uniform between other shift positions in a speed region equal to or more than a predetermined second speed V2 (for example, 70 km/h or the like). In addition, in a speed region less than the predetermined second speed V2 (for example, 70 km/h), a degree of a decrease in engine load deceleration in accordance with a decrease in vehicle speed is set to be larger in the case where the shift position is a low gear than in the case where the shift position is other than the low gear. Further, in the case where the shift position is the low gear, in a speed region less than a predetermined first speed V1 (for example, 7 km/h or the like), an acceleration caused by a creep torque becomes larger than an engine load deceleration, and hence an acceleration increasing in accordance with a decrease in vehicle speed is generated.

In addition, in the predetermined map shown in FIG. 2, an example is described in which the shift position is the low gear or other than the low gear, but a corresponding relationship between the acceleration correction amount and the vehicle speed may be set in a plurality of shift positions.

The acceleration correcting unit 33 corrects the vehicle body acceleration calculated by the vehicle body acceleration calculating unit 31 by using the acceleration correction amount calculated by the acceleration correction amount calculating unit 32 so as to calculate a deceleration caused by a brake operation from the vehicle body deceleration during the deceleration of the vehicle.

The ring buffer 34 stores a predetermined number of input data (for example, 20 or the like) from the present to the past (for example, for 2 seconds or the like) among data obtained by a combination of an acceleration (that is, a deceleration caused by a brake operation) calculated by the acceleration correcting unit 33 and a brake fluid pressure detected by the brake fluid pressure sensor 23.

The deceleration coefficient calculating unit 35 calculates the average value of a ratio between the brake fluid pressure and the deceleration caused by the brake operation by using data obtained from a time point when the vehicle speed detected by the vehicle speed sensor 21 is equal to or less than a predetermined value Va (for example, 2 km/h or the like) to a past predetermined time Ta (for example, 2 seconds or the like) among data stored in the ring buffer 34, and outputs the calculation result as a fluid pressure deceleration coefficient.

Figure 3:
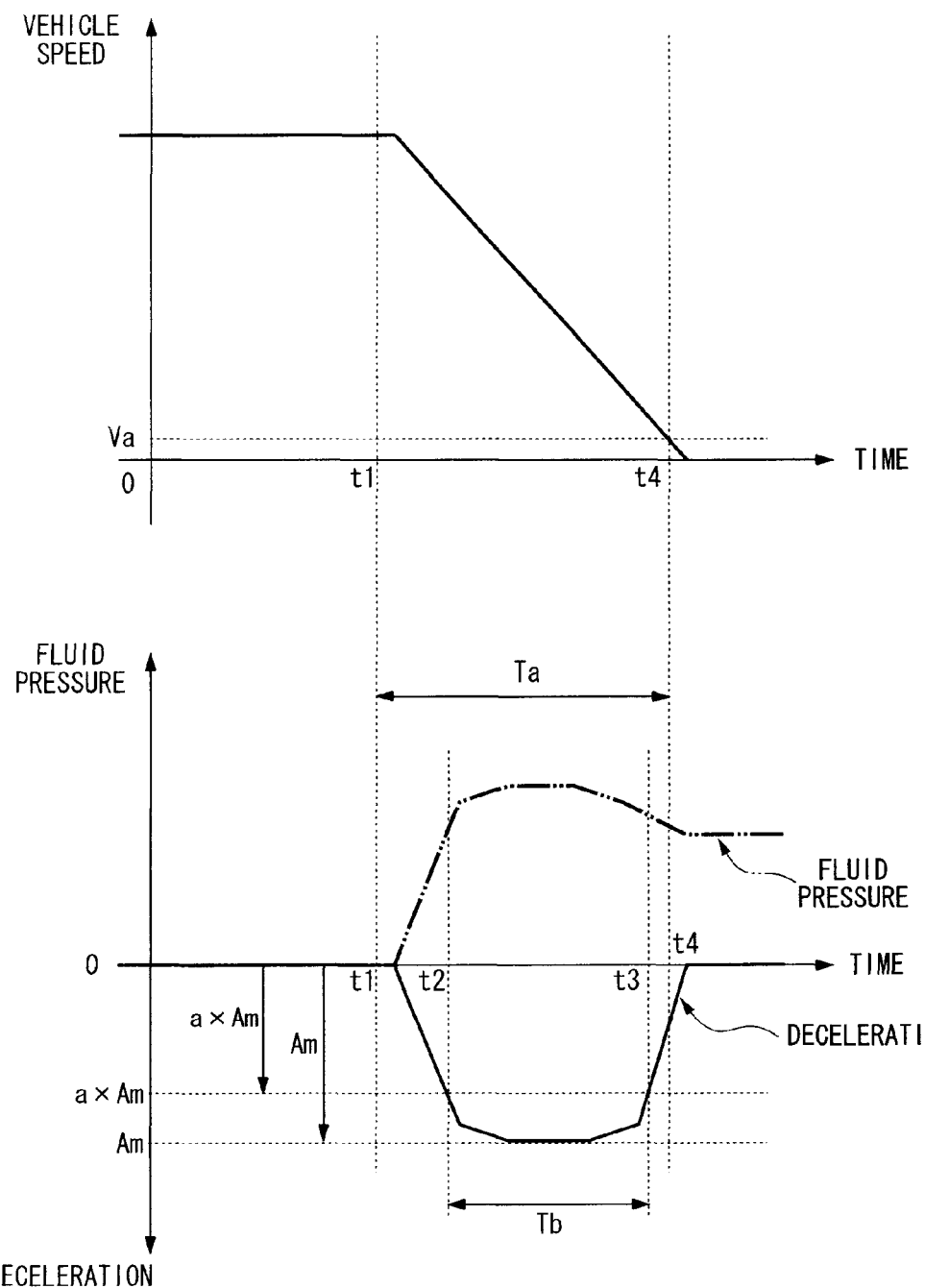
FIG. 3 is a timing chart illustrating a variation in time of a deceleration, a brake fluid pressure, and a vehicle speed according to the embodiment.

As shown in FIG. 3, the deceleration coefficient calculating unit 35 obtains a maximum value Am (that is, a peak value of the acceleration calculated by the acceleration correcting unit 33) of the deceleration caused by the brake operation on the basis of data stored in the ring buffer 34 during a period from a time t1 to a time t4 in the past for a predetermined time Ta (for example, 2 seconds or the like) from a time t4 at the time t4 when the vehicle speed decreasing with the elapse of time during the deceleration of the vehicle arrives at a predetermined value Va (for example, 2 km/h or the like). In addition, an average value of a ratio between the deceleration and the brake fluid pressure is calculated from data (for example, data stored in the ring buffer 34 during a period Tb shown in FIG. 3) of the deceleration in the range (that is, the range of "a×Am to Am") of a predetermined ratio a (for example, 80% or the like) with respect to the maximum value Am and the brake fluid pressure corresponding to the deceleration.

The first gradient estimating unit 36 estimates a gradient of the road being traveled on the basis of the fluid pressure deceleration coefficient calculated by the deceleration coefficient calculating unit 35.

The first gradient estimating unit 36 obtains a slope level corresponding to the fluid pressure deceleration coefficient calculated by the deceleration coefficient calculating unit 35 with reference to a predetermined map or the like as shown in the following Table 1. The slope level is set in accordance with a degree of the gradient of an uphill or a downhill, where a positive value indicates a degree of an ascending gradient, a negative value indicates a degree of a descending gradient, and the degree of the gradient increases in accordance with an increase in absolute value.

TABLE 1

| FLUID PRESSURE DECELERATION COEFFICIENT (ABSOLUTE VALUE) | SLOPE LEVEL |
| --- | --- |
| NOT LESS THAN THa | ±2 |
| NOT LESS THAN THb AND LESS THAN THa | ±1 |
| LESS THAN THa | 0 |

(THa > THb)

In the predetermined map shown in Table 1, when the absolute value of the fluid pressure deceleration coefficient is not less than a predetermined first threshold value THa, a slope level is ±2. When the absolute value of the fluid pressure deceleration coefficient is not less than a predetermined second threshold value THb (<THa) smaller than the first threshold value THa and is less than the predetermined first threshold value THa, the slope level is ±1. When the absolute value of the fluid pressure deceleration coefficient is less than the predetermined second threshold value THb, the slope level is zero.

The gradient acceleration calculating unit 37 calculates an acceleration (gradient acceleration) reflecting an acceleration of gravity in accordance with a gradient of the road being traveled by subtracting the vehicle body acceleration calculated by the vehicle body acceleration calculating unit 31 from the acceleration acting on the vehicle body in the longitudinal direction detected by the acceleration sensor 22.

The gradient converting unit 38 converts the gradient acceleration into a gradient conversion value by applying a predetermined conversion coefficient to the gradient acceleration calculated by the gradient acceleration calculating unit 37. In the gradient conversion value, a positive value indicates a degree of an ascending gradient, and a negative value indicates a degree of a descending gradient.

The second gradient estimating unit 39 estimates the gradient of the road being traveled on the basis of the gradient conversion value calculated by the gradient converting unit 38.

The second gradient estimating unit 39 obtains the slope level corresponding to the gradient conversion value calculated by the gradient converting unit 38 with reference to a predetermined map or the like as shown in the following Table 2.

In the predetermined map shown in the following Table 2, when the absolute value of the gradient conversion value is not less than a predetermined first gradient value Ga % (for example, 12% or the like), the slope level is ±2. When the absolute value of the gradient conversion value is not less than a predetermined second gradient value Gb % (for example, 6% or the like) smaller than the first gradient value Ga % and is less than the predetermined first gradient value Ga %, the slope level is ±1. When the absolute value of the gradient conversion value is less than the predetermined second gradient value Gb %, the slope level is zero.

TABLE 2

| GRADIENT CONVERSION VALUE (ABSOLUTE VALUE) | SLOPE LEVEL |
|---|---|
| NOT LESS THAN Ga % | ±2 |
| NOT LESS THAN Gb % AND LESS THAN Ga % | ±1 |
| LESS THAN Gb % | 0 |

(Ga > Gb)

The control gradient setting unit 40 sets the larger one of the gradient (that is, the slope level) estimated by the first gradient estimating unit 36 and the gradient (that is, the slope level) estimated by the second gradient estimating unit 39 as a vehicle control gradient.

The traveling control unit 41 outputs a control signal for controlling a traveling state (for example, a traveling state and a stop state of the subject vehicle following the preceding vehicle) of the subject vehicle on the basis of the signal of the detection result of the inter-vehicular distance between the subject vehicle and another vehicle (for example, the preceding vehicle or the like) existing in front of the subject vehicle detected by the inter-vehicular distance sensor 24 and the control gradient set by the control gradient setting unit 40. The control signal includes a control signal for controlling a gear shifting operation of the transmission (T/M), a control signal for controlling a driving force of the internal combustion engine (E) by using the throttle actuator 13, a control signal for controlling a deceleration due to the brake by using the brake actuator 14, or the like.

The vehicle gradient estimating device 10a and the vehicle traveling control device 10 according to the present embodiment have the above-described configuration. Next, operations of the vehicle gradient estimating device 10a and the vehicle traveling control device 10, and particularly, processes of setting the fluid pressure deceleration coefficient and setting the slope level will be described with reference to the drawings.

Hereinafter, a process of setting the fluid pressure deceleration coefficient will be described.

Figure 4:
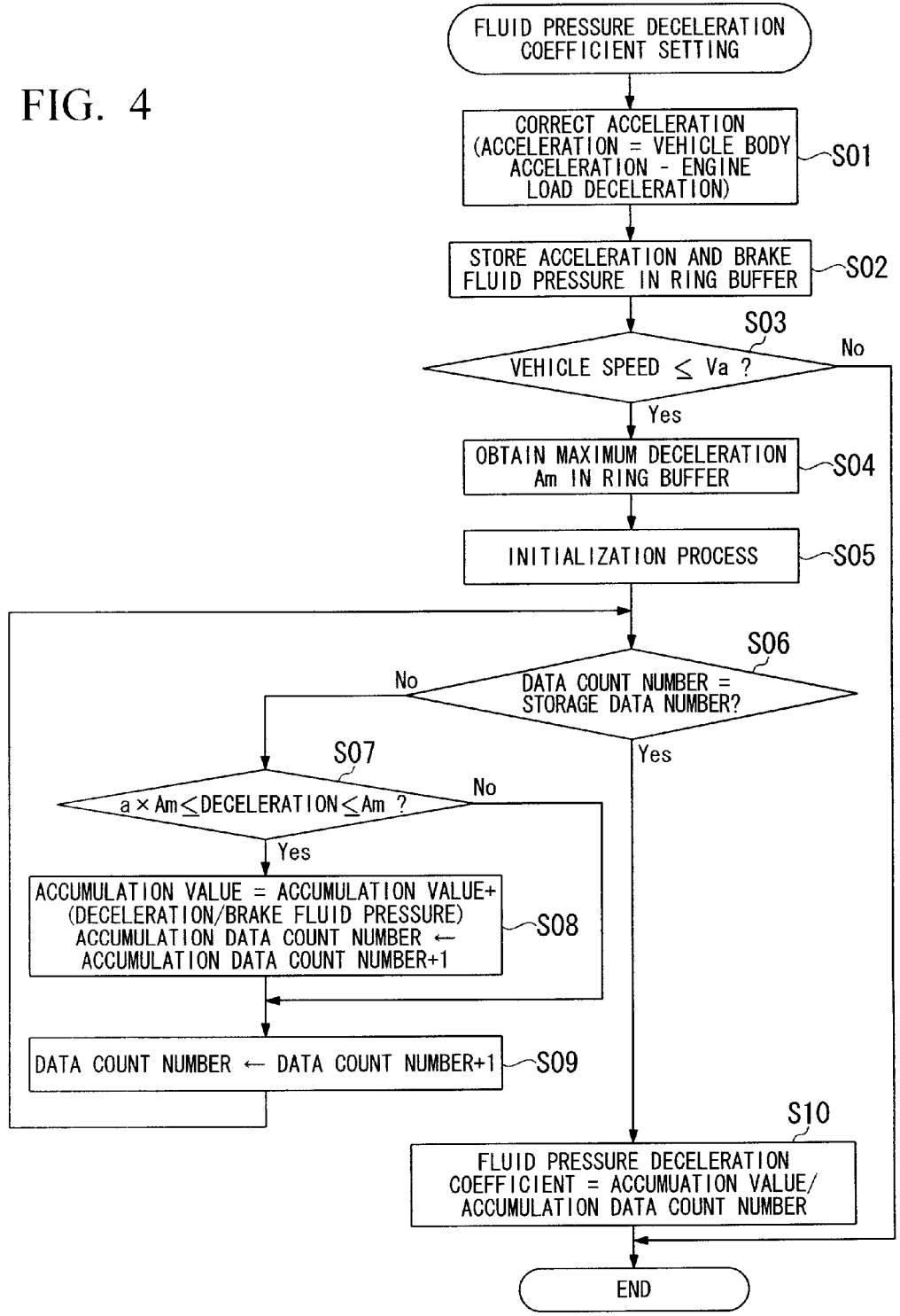
FIG. 4 is a flowchart illustrating a process of setting a fluid pressure deceleration coefficient according to the embodiment.

First, in Step S01 shown in FIG. 4, an acceleration correction process is used to calculate an acceleration (that is, a deceleration caused by the brake operation) of the vehicle by subtracting the engine load deceleration from the vehicle body acceleration calculated on the basis of the detection result of the vehicle speed.

Subsequently, in Step S02, data obtained by the combination of the acceleration (that is, the deceleration caused by the brake operation) calculated by the acceleration correction process and the brake fluid pressure detected by the brake fluid pressure sensor 23 is stored in the ring buffer 34.

Subsequently, in Step S03, it is determined whether the vehicle speed detected by the vehicle speed sensor 21 is equal to or less than the predetermined value Va (for example, 2 km/h or the like).

When the determination result is "NO", the present step proceeds to the end.

On the other hand, when the determination result is "YES", the present step proceeds to Step S04.

Subsequently, in Step S04, the maximum value Am (maximum deceleration Am) of the deceleration caused by the brake operation is obtained from data stored in the ring buffer 34.

Subsequently, in Step S05, each value of an accumulation value, an accumulation data count number, a data count number, and the like is set to zero as an initialization process.

Then, each data stored in the ring buffer 34 is subjected to the processes in the following Step S06 to Step S10.

Subsequently, in Step S06, it is determined whether the data count number is equal to a predetermined number of input data (for example, 20 or the like).

When the determination result is "YES", the present step moves to Step S10 to be described later.

On the other hand, when the determination result is "NO", the present step proceeds to Step S07.

Subsequently, in Step S07, it is determined whether the deceleration of data stored in the ring buffer 34 is in the range (that is, the range of "a×Am to Am") of a predetermined ratio a (for example, 80% or the like) with respect to the maximum deceleration Am.

When the determination result is "NO", the present step proceeds to Step S09 to be described later.

On the other hand, when the determination result is "YES", the present step proceeds to Step S08.

Subsequently, in Step S08, a value obtained by adding a ratio (deceleration/brake fluid pressure) between a deceleration and a brake fluid pressure using data stored in the ring buffer 34 to the accumulation value is set as a new accumulation value. Then, a value obtained by adding "1" to the accumulation data count number is set as a new accumulation data count number.

Subsequently, in Step S09, a value obtained by adding "1" to the data count number is set to a new data count number, and the present step returns to Step S06.

Then, in Step S10, a value (accumulation value/accumulation data count number) obtained by dividing the accumulation value by the accumulation data count number is set as a fluid pressure deceleration coefficient, and the present step proceeds to the end.

Hereinafter, a process of setting the slope level by using the first gradient estimating unit 36 will be described.

Figure 5:
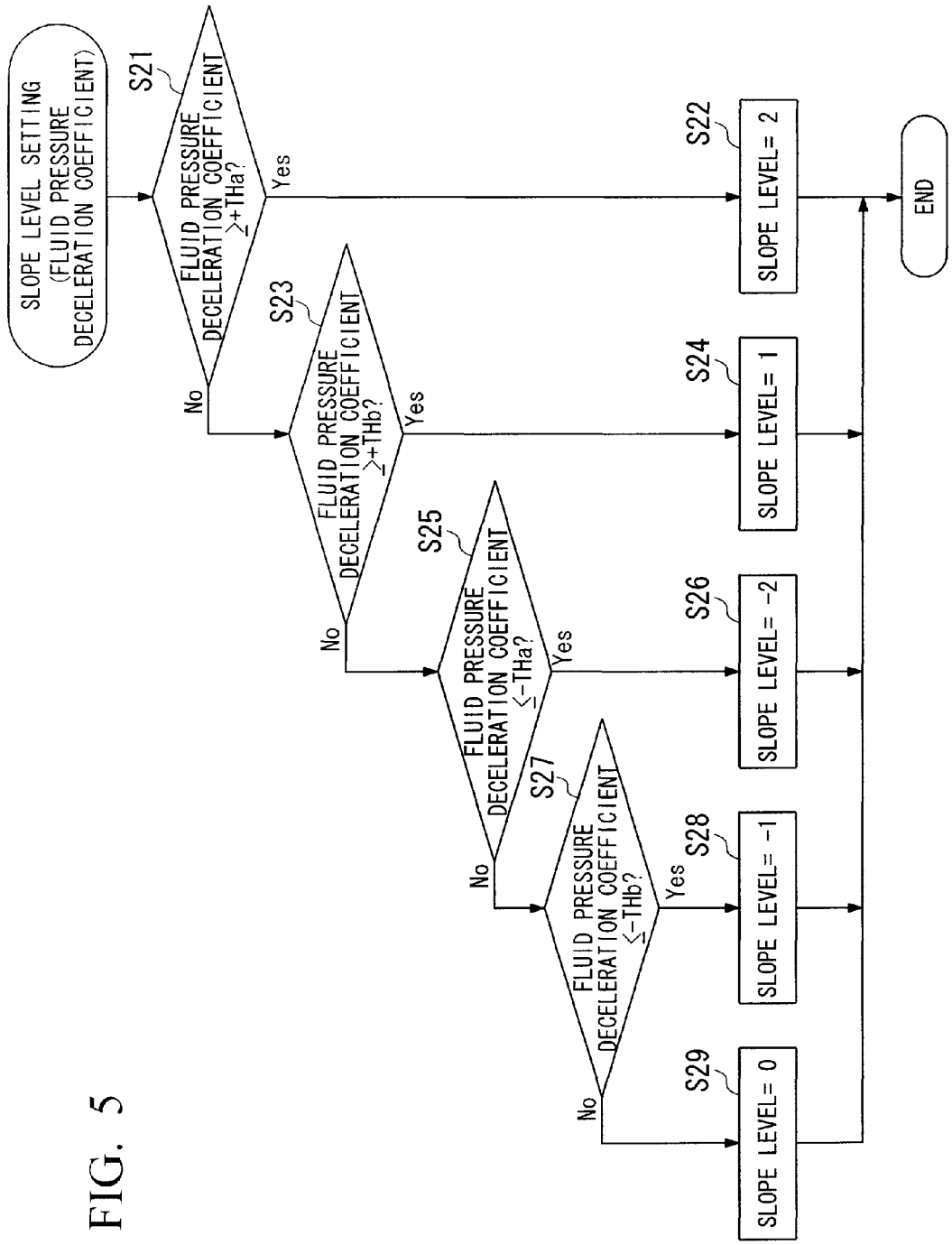
FIG. 5 is a flowchart illustrating a process of setting a slope level according to the embodiment.

First, in Step S21 shown in FIG. 5, it is determined whether the fluid pressure deceleration coefficient is not less than the predetermined first threshold value THa.

When the determination result is "YES", the present step proceeds to Step S22. In Step S22, the slope level is set to +2, and the present step proceeds to the end.

On the other hand, when the determination result is "NO", the present step proceeds to Step S23.

Subsequently, in Step S23, it is determined whether the fluid pressure deceleration coefficient is not less than a predetermined second threshold value THb.

When the determination result is "YES", the present process proceeds to Step S24. In Step S24, the slope level is set to +1, and the present process proceeds to the end.

On the other hand, when the determination result is "NO", the present step proceeds to Step S25.

Subsequently, in Step S25, it is determined whether the fluid pressure deceleration coefficient is equal to or less than a negative value (−THa) of a predetermined first threshold value THa.

When the determination result is "YES", the present step proceeds to Step S26. In Step S26, the slope level is set to −2, and the present step proceeds to the end.

On the other hand, when the determination result is "NO", the present step proceeds to Step S27.

Subsequently, in Step S27, it is determined whether the fluid pressure deceleration coefficient is equal to or less than a negative value (−THb) of a predetermined second threshold value THb.

When the determination result is "YES", the present step proceeds to Step S28. In Step S28, the slope level is set to −1, and the present step proceeds to the end.

On the other hand, when the determination result is "NO", the present step proceeds to Step S29. In Step S29, the slope level is set to zero, and the present step proceeds to the end.

Figure 6:
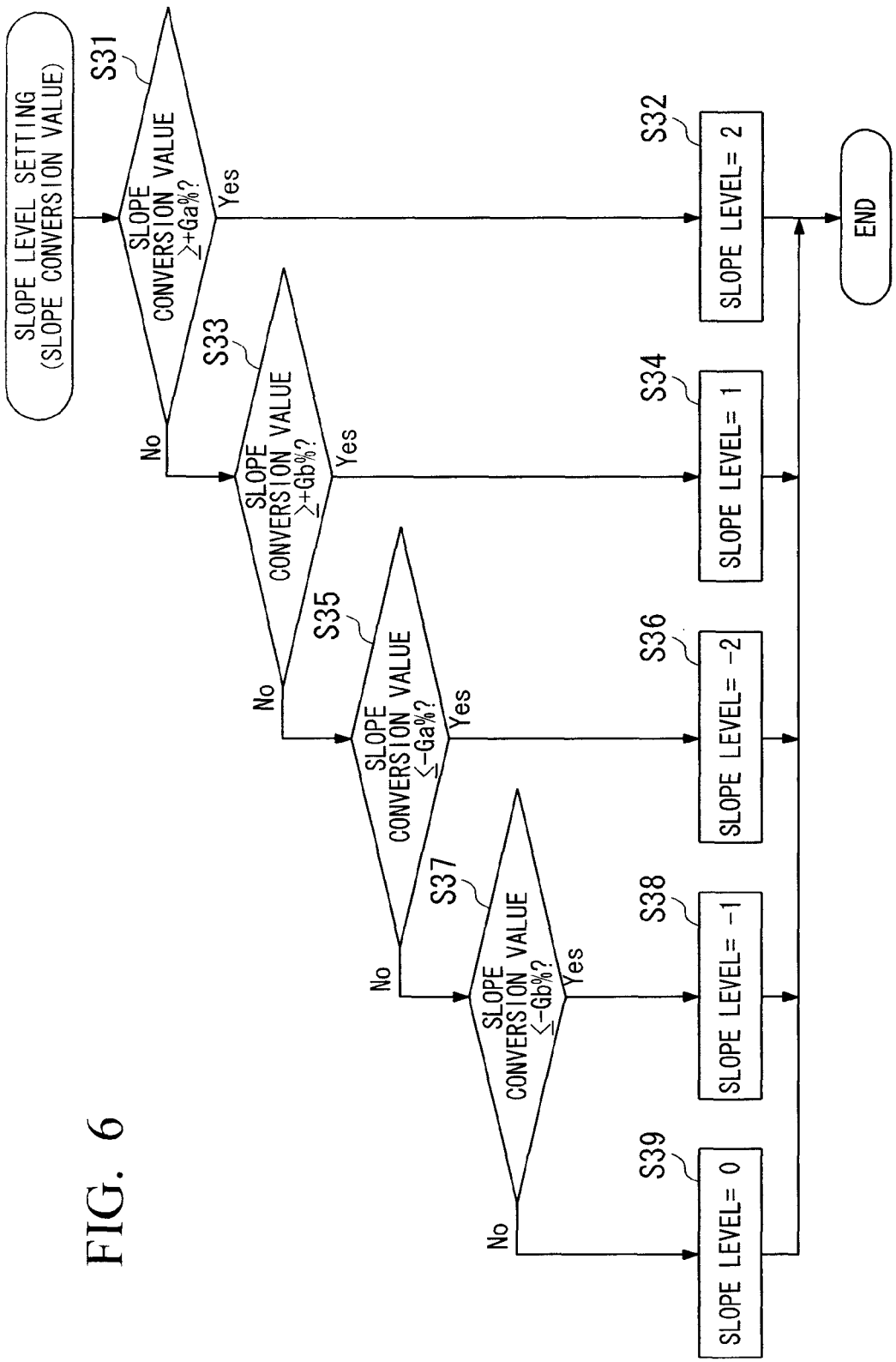
FIG. 6 is a flowchart illustrating a process of setting a slope level according to the embodiment.

Hereinafter, a process of setting the slope level by using the second gradient estimating unit 39 will be described. First, in Step S31 shown in FIG. 6, it is determined whether the gradient conversion value is not less than a predetermined first gradient value Ga %.

When the determination result is "YES", the present step proceeds to Step S32. In Step S32, the slope level is set to +2, and the present step proceeds to the end.

On the other hand, when the determination result is "NO", the present step proceeds to Step S33.

Subsequently, in Step S33, it is determined whether the gradient conversion value is not less than a predetermined second gradient value Gb %.

When the determination result is "YES", the present step proceeds to Step S34. In Step S34, the slope level is set to +1, and the present step proceeds to the end.

On the other hand, when the determination result is "NO", the present step proceeds to Step S35.

Subsequently, in Step S35, it is determined whether the gradient conversion value is equal to or less than a negative value (−Ga %) of a predetermined first gradient value Ga %.

When the determination result is "YES", the present step proceeds to Step S36. In Step S36, the slope level is set to −2, and the present step proceeds to the end.

On the other hand, when the determination result is "NO", the present step proceeds to Step S37.

Subsequently, in Step S37, it is determined whether the gradient conversion value is equal to or less than a negative value (−Gb %) of a predetermined second gradient value Gb %.

When the determination result is "YES", the present step proceeds to Step S38. In Step S38, the slope level is set to −1, and the present step proceeds to the end.

On the other hand, when the determination result is "NO", the present step proceeds to Step S39. In Step S39, the slope level is set to zero, and the present step proceeds to the end.

As described above, according to the vehicle gradient estimating device 10a of the present embodiment of the present invention, the first gradient estimating unit 36 estimates the gradient of the road being traveled on the basis of the brake fluid pressure and the acceleration calculated from the vehicle speed of the vehicle immediately before the vehicle stops (for example, a period before the vehicle speed is equal to or less than 2 km/h) without using the output of the acceleration sensor 22 for directly detecting the vehicle body acceleration. Accordingly, it is possible to easily improve the estimation precision, and to accurately estimate whether the road being traveled is on a slope (uphill or downhill).

In addition, since the vehicle body acceleration calculated from the vehicle speed is corrected by the acceleration correction amount including an engine load deceleration, an acceleration due to a creep torque, and the like, it is possible to further improve the estimation precision of the gradient.

Further, since the gradient of the road being traveled is estimated on the basis of data obtained from a time point when the vehicle speed is equal to or less than a predetermined value Va (for example, 2 km/h or the like) to a predetermined time Ta (for example, 2 seconds or the like) among data stored in the ring buffer 34, it is possible to easily improve the estimation precision. In addition, since data regarding the brake fluid pressure corresponding to the deceleration and the deceleration in the range (that is, the range of "a×Am to Am") of a predetermined ratio a (for example, 80% or the like) with respect to the maximum value Am (maximum deceleration Am) of the deceleration within a predetermined time Ta in the past is used among data stored in the ring buffer 34, it is possible to prevent a problem that a gradient estimation error increases by data of the vehicle body acceleration calculated from the vehicle speed in a low speed region where the detection error increases.

Furthermore, it is possible to improve a calculation precision of the acceleration correction amount including the engine load deceleration, the acceleration due to the creep torque, and the like by using the information of the shift position. Accordingly, it is possible to appropriately correct the vehicle body acceleration calculated from the vehicle speed, and thus to highly precisely calculate the deceleration caused by the brake operation.

Moreover, since the larger one of two gradients (that is, the slope levels estimated by the first gradient estimating unit 36 and the second gradient estimating unit 39) obtained by different estimation processes is set as the vehicle control gradient, it is possible to prevent a problem that an uphill is estimated as a flat road, and thus to prevent the subject vehicle from moving backward on the uphill.

In addition, according to the vehicle traveling control device 10 of the present embodiment of the present invention, since the traveling state and the stop state of the subject vehicle following the preceding vehicle is controlled on the basis of the inter-vehicular distance and the vehicle control gradient, even when a starting driving force is set due to an erroneous estimation in which the flat road is estimated to be uphill, it is possible to prevent a problem of the inter-vehicular distance between the preceding vehicle and the subject vehicle is not appropriate.

While a preferred embodiment of the present invention has been described and illustrated above, it should be understood that this is an exemplary of the present invention and is not to be considered as limiting. Additions, omissions, substitutions, and other modifications can be made without departing from the scope of the present invention. Accordingly, the present invention is not to be considered as being limited by the foregoing description, and is only limited by the scope of the appended claims.

What is claimed is:

1. A vehicle gradient estimating device comprising:
a vehicle speed sensor which detects a traveling speed of a subject vehicle;
an acceleration calculating unit which calculates an acceleration of the subject vehicle on the basis of the traveling speed;
an engine load deceleration calculating unit which calculates a deceleration due to an engine load of the subject vehicle;
an acceleration correcting unit which corrects the acceleration by using the deceleration;
a brake fluid pressure detecting unit which detects a brake fluid pressure of the subject vehicle; and
a first gradient estimating unit which estimates a gradient of a road being travelled of the subject vehicle,
wherein the first gradient estimating unit estimates the gradient on the basis of a ratio between the brake fluid pressure and the acceleration corrected by the acceleration correcting unit.

2. The vehicle gradient estimating device according to claim 1, further comprising a storage unit which stores data of the brake fluid pressure and the acceleration corrected by the acceleration correcting unit for a predetermined time,
wherein the first gradient estimating unit estimates the gradient on the basis of the data within the predetermined time before a time point when the traveling speed is equal to or less than a predetermined value among the data stored in the storage unit.

3. The vehicle gradient estimating device according to claim 2, further comprising a peak value calculating unit which calculates a peak value of the acceleration corrected by the acceleration correcting unit among the data stored for the predetermined time, wherein the first gradient estimating unit estimates the gradient on the basis of the ratio between the brake fluid pressure and the acceleration within a predetermined ratio range with respect to the peak value among the data stored in the storage unit.

4. The vehicle gradient estimating device according to claim 1, further comprising a gear shift information obtaining unit which obtains an information on a gear shift state of a transmission mounted on the subject vehicle, wherein the engine load deceleration calculating unit calculates the deceleration on the basis of the information on the gear shift state and the traveling speed.

5. The vehicle gradient estimating device according to claim 1, further comprising:

an acceleration sensor which detects an acceleration of the subject vehicle in a longitudinal direction;

a second gradient estimating unit which estimates a gradient of the road being travelled on the basis of the acceleration in the longitudinal direction detected by the acceleration sensor and the acceleration calculated on the basis of the traveling speed detected by the vehicle speed sensor; and a vehicle control gradient setting unit which sets the larger one of the gradient estimated by the first gradient estimating unit and the gradient estimated by the second gradient estimating unit as a vehicle control gradient.

6. A vehicle traveling control device comprising:

the vehicle gradient estimating device according to claim 5;

an inter-vehicular distance detecting unit which is mounted on the subject vehicle and which detects an inter-vehicular distance between the subject vehicle and a preceding vehicle; and a traveling control unit which controls a traveling state and a stop state of the subject vehicle following the preceding vehicle on the basis of the vehicle control gradient and the inter-vehicular distance.

7. A vehicle gradient estimating method, comprising the steps of:

detecting a traveling speed of a subject vehicle;

calculating an acceleration of the subject vehicle on the basis of the traveling speed;

calculating a deceleration due to an engine load of the subject vehicle;

correcting the acceleration by using the deceleration to obtain a corrected acceleration;

detecting a brake fluid pressure of the subject vehicle; and estimating a first gradient of a road being travelled of the subject vehicle on the basis of a ratio between the brake fluid pressure and the corrected acceleration.

8. The vehicle gradient estimating method according to claim 7, further comprising the step of storing data of the brake fluid pressure and the corrected acceleration for a predetermined time, wherein in the step of estimating the first gradient, the first gradient is estimated on the basis of the data within the predetermined time before a time point when the traveling speed is equal to or less than a predetermined value among the stored data.

9. The vehicle gradient estimating method according to claim 8, further comprising the step of calculating a peak value of the corrected acceleration among the data stored for the predetermined time, wherein in the step of estimating the first gradient, the first gradient is estimated on the basis of the ratio between the brake fluid pressure and the corrected acceleration within a predetermined ratio range with respect to the peak value among the stored data.

10. The vehicle gradient estimating method according to claim 7, further comprising the step of obtaining an information on a gear shift state of a transmission mounted on the subject vehicle, wherein in the step of calculating the deceleration, the deceleration is calculated on the basis of the information on the gear shift state and the traveling speed.

11. The vehicle gradient estimating method according to claim 7, further comprising the steps of:

detecting an acceleration of the subject vehicle in a longitudinal direction;

estimating a second gradient of the road on the basis of the acceleration provided by the detection and the acceleration calculated on the basis of the traveling speed; and selecting the larger one of the first gradient and the second gradient as a vehicle control gradient.

12. A vehicle traveling control method comprising:

the vehicle gradient estimating method according to claim 11;

a step of detecting an inter-vehicular distance between the subject vehicle and a preceding vehicle; and a step of controlling a traveling state and a stop state of the subject vehicle following the preceding vehicle on the basis of the vehicle control gradient and the inter-vehicular distance.

* * * * *